(12) United States Patent
Ryu

(10) Patent No.: US 6,718,513 B1
(45) Date of Patent: Apr. 6, 2004

(54) FAULT MONITORING SYSTEM AND FAULT REPORTING METHOD

(75) Inventor: Morihisa Ryu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 361 days.

(21) Appl. No.: 09/709,215

(22) Filed: Nov. 9, 2000

(30) Foreign Application Priority Data

Jan. 31, 2000 (JP) .................................. 2000-021167

(51) Int. Cl.[7] .............................................. H03M 13/00
(52) U.S. Cl. ................................... 714/799; 370/242
(58) Field of Search ..................... 395/185.01; 702/185, 702/58; 375/48; 324/536; 370/244, 242; 714/799

(56) References Cited

U.S. PATENT DOCUMENTS

| | | | | |
|---|---|---|---|---|
| 5,708,775 A | * | 1/1998 | Nakamura | 395/185.01 |
| 6,256,594 B1 | * | 7/2001 | Yamamoto et al. | 702/185 |
| 6,259,996 B1 | * | 7/2001 | Haun | 702/58 |
| 6,310,911 B1 | * | 10/2001 | Burke et al. | 375/48 |
| 6,362,628 B2 | * | 3/2002 | Mabeth et al. | 324/536 |
| 6,373,819 B1 | * | 4/2002 | Lundh | 370/244 |

FOREIGN PATENT DOCUMENTS

| | | | |
|---|---|---|---|
| JP | 63-124651 | | 5/1988 |
| JP | 10074108 | * | 3/1998 |

* cited by examiner

*Primary Examiner*—David Ton
(74) *Attorney, Agent, or Firm*—Katten Muchin Zavis Rosenman

(57) ABSTRACT

A fault monitoring system and fault reporting method therefore that monitor faults in a transmission system and notify a monitoring unit including maintenance personnel, a monitoring device, etc. have a fault detection unit that detects occurrence of faults and release of faults of units in a transmission system, and a fault history information generation logic unit 2 that adds one-bit fault history information to a software counter unit based on the fault occurrence information or fault release information from the fault detection unit, the presence of any change for each software reading timing, and the previous-time output information.

5 Claims, 10 Drawing Sheets

| SWt-1 | Δ(t, t-1) | HWt | SWt |
|---|---|---|---|
| 0 | 0 | 0 | 0 |
| 0 | 0 | 1 | 1 |
| 0 | 1 | 0 | 1 |
| 0 | 1 | 1 | 1 |
| 1 | 0 | 0 | 0 |
| 1 | 0 | 1 | 1 |
| 1 | 1 | 0 | 0 |
| 1 | 1 | 1 | 0 |

FAULT HISTORY INFORMATION

FAULT MONITORING SYSTEM AND FAULT REPORTING METHOD

BACKGROUND OF THE INVENTION

1. Field of the Invention

The present invention relates to a fault monitoring system and a fault reporting method in which the state of fault occurrence or fault release in transmission systems of various types is detected and reported to a monitoring unit including maintenance personnel, a monitoring device, etc.

2. Description of the Prior Art

In a transmission system that connects multiple transmission devices via transmission paths, a configuration is adopted in which fault occurrence information and fault release information is collected by a monitoring device, either for each transmission device or for the system as a whole, and is reported to the maintenance personnel. In transmission systems of redundant configuration, configurations are also known in which the occurrence of a fault causes a switchover from the in-use side (work side) to the spare side (protection side), and transmission continues using an intact transmission device or transmission path.

Fault occurrence information in a transmission system is information on various abnormal states that are detected, such as a reception signal cutoff in a transmission device, clock signal cutoff, missynchronization, increase in the error rate, or an abnormal temperature increase, and in the case of an unstable operation state, sometimes fault occurrence information and fault release information occur repeatedly in alternation. When an alarm is sent for such a situation, sometimes the alarm is sent and stopped repeatedly. Therefore a device is adopted in which an alarm is sent if the fault occurrence continues for a prescribed time or longer, and the alarm is stopped if the fault release continues for a prescribed time or longer.

FIG. 9 is an explanatory diagram of a conventional configuration and shows an overview of a fault monitoring system, in which 51 is a fault detection unit, 52 is an up-down counter, and 53 is software. Fault detection unit 51 has the function of detecting faults in the units of the transmission devices and transmission system. The detection unit 51 for example outputs "1" when it detects a fault occurrence and "0" when it detects a fault release; up-down counter 52 increments the prescribed number by a "1" fault occurrence detection signal from fault detection unit 51 and decrements the prescribed number by a "0" fault release detection signal from fault detection unit 51.

If, by being incremented, the count value of the up-down counter 52 exceeds a preset value, it shows that fault occurrence detection has continued for the prescribed time, so a fault occurrence is reported to software 53. In this way, software 53 immediately reports the fault occurrence to a monitoring unit that includes maintenance personnel or a monitoring device (not shown). If, by being decremented, the count value of up-down counter 52 falls below a preset value, it shows that fault release detection has continued for the prescribed time, so a fault release is reported to software 53. In this way, software 53 reports the fault release to a monitoring unit that includes maintenance personnel, a monitoring device, etc. In this case it is possible to independently set the count value of up-down counter 52, the threshold value for concluding that a fault has occurred, and the threshold value for concluding that a fault has been released.

FIG. 10 is an explanatory diagram of another conventional configuration wherein 61 is a fault detection unit, 62 is a logic unit, and 63 is a software counter unit. The configuration shown in FIG. 9 above is the case in which a hardware counter is used, but the case shown in FIG. 10 is the case in which a software counter is used. Similar to the above-mentioned fault detection unit 51, fault detection unit 61 outputs, for example, "1" when it detects a fault occurrence and "0" when it detects a fault release.

Logic unit 62 reads the detection signal from fault detection unit 61 in accordance with the reading timing signal of the software, and if this detection signal indicates the fault occurrence detection state of "1", inputs fault detection information to software counter unit 63 as "1" and fault release information to it as "0", and if the detection signal from fault detection unit 61 indicates fault release by "0", inputs fault detection information to software counter unit 63 as "0" and fault release information to it as "1".

Moreover, logic unit 62 inputs both fault detection information and fault release information to software counter unit 63 as "1" if, by the next reading timing signal, the detection signal is different from the previous time it read a detection signal from fault detection unit 61. This software counter unit 63, which has the functions of fault detection state continuation counter and fault release state continuation counter, resets everything to zero if both the fault detection information and the fault release information are "1", and if the fault release information is "0" and the fault detection information is "1", it increments the fault detection state continuation counter, and if the count value exceeds the set value, reports a fault occurrence to the monitoring unit of maintenance personnel, monitoring device, etc.

If the fault release information is "1" and the fault detection information is "0", it increments the fault release state continuation counter, and if the count value exceeds the set value, reports a fault release to the monitoring unit of maintenance personnel, monitoring device, etc. In this case too, the threshold value with respect to the count value of the fault detection state continuation counter of software counter unit 63 and the threshold value with respect to its fault release state continuation counter can each be set independently.

A fault occurrence in a transmission system is detected by fault detection units 51, and 61 of hardware composition, and a fault occurrence or fault release is reported from the software to the monitoring unit of maintenance personnel or a monitoring device, etc., and because it has the tendency of transmission device miniaturization and an increase in the number of circuits accommodated, there is a desire that the size of the hardware and software that detects and handles faults of many types should be made smaller.

In answer to such desires, the conventional example shown in FIG. 9 must have an up-down counter 52 for various types of faults, and therefore there is the problem that its hardware configuration becomes large. With the conventional example shown in FIG. 10, fault detection information and fault release information must be conveyed separately between the hardware and software, and in this case too, because it must be conveyed with the fault release information of the fault detection information according to the type of fault, there is the problem that it is difficult to reduce its size.

SUMMARY OF THE INVENTION

An object of this invention is to reduce its size and to make fault detection easy even if in multiplex transmission.

This and other objects are attained by a fault monitoring system that monitors faults and reports them to a monitoring unit including maintenance personnel, a monitoring device, etc. The fault monitoring system of the present invention comprises a fault detection unit that detects the occurrence of faults and the release of faults, and a fault history information generation logic unit that reports to a software counter unit, as fault history information of one-bit composition, presence of any changes, based on fault occurrence information or fault release information from the fault detection unit, the presence of any change for each reading timing, and the previous-time output information.

According to the present invention the fault monitoring system has a software counter unit that counts the consecutive number of times of the same fault history information from fault history information generation logic unit and reports the fault occurrences or fault releases to the monitoring unit upon reaching a set count value.

The fault monitoring system of the present invention further comprises a change detection unit that detects changes in the fault occurrence circuit number or other state information, and an output zero fixed control unit that forcibly resets the count value of the software counter unit that inputs the fault history information from fault history information generation logic unit when a change in the state information is detected by this change detection unit.

A fault reporting method of the present invention is a process in which it is decided whether there is any change for each reading timing of fault occurrence information or fault release information from fault detection units, fault history information of one-bit composition is formed, the consecutive number of times the same content of this history information is counted by a software counter unit, and when the count exceeds a set value, the fault occurrence or fault release is reported to the monitoring unit, which includes maintenance personnel, a monitoring device, etc.

In an embodiment, the fault reporting method is a process wherein state information that reports PDI-P code or other fault states or other states is extracted, the presence of any change in the extracted state information is detected, and when there is a change, the count value of the software counter unit that counts fault history information is forcibly reset, then a count operation is performed in accordance with the fault history information from the fault history information generation logic unit.

DETAILED DESCRIPTION OF THE PREFERRED EMBODIMENTS

Figure 1:
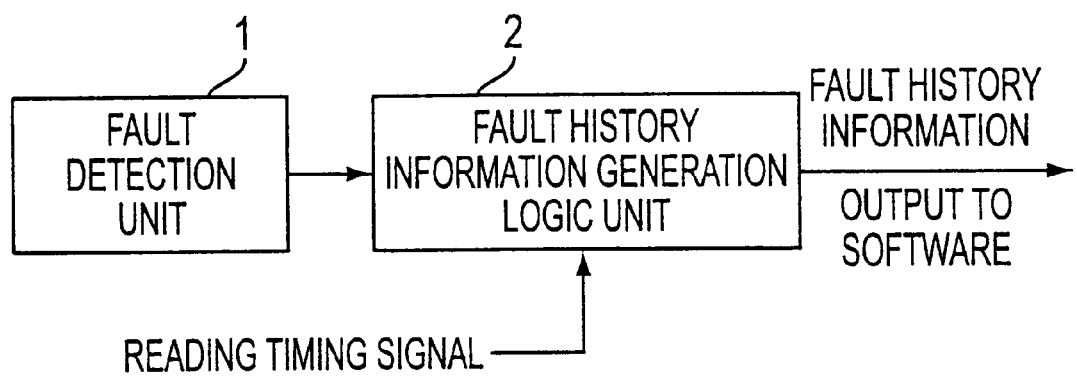
FIG. 1 is a diagram for explaining the principles of the present invention.

In FIG. 1, which is a diagram for explaining the principles of this invention, 1 is a fault detection unit and 2 is a fault history information generation logic unit. Fault detection unit 1 detects fault occurrences and fault releases in each part of the transmission device and transmission system. Various known means can be applied. The fault history information generation logic unit 2 reads the detection signal of fault detection unit 1 in accordance with software reading timing signals, generates fault history information, and sends it to software (not shown).

Figure 2:
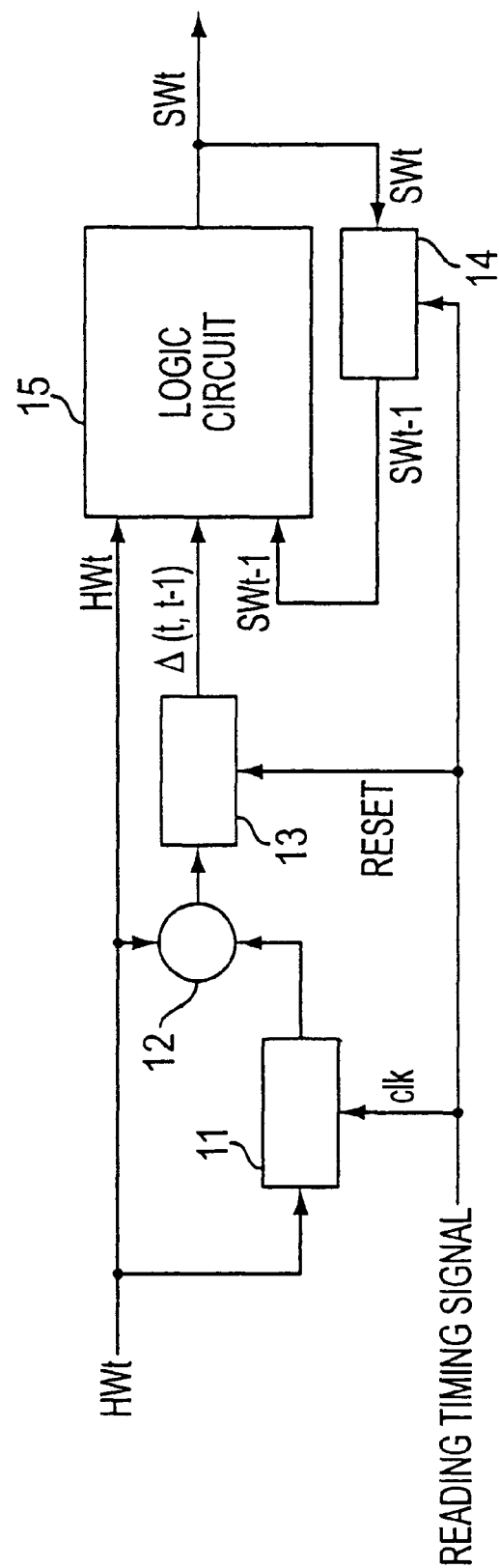
FIG. 2 is a block diagram of a fault history information generation logic unit of an embodiment of the present invention.

FIG. 2, which is a block diagram of the fault history information generation logic unit of an embodiment of this invention, shows an embodiment of the composition of the fault history information generation logic unit 2 of FIG. 1 wherein 11 is a flipflop or other memory unit, 12 is an exclusive OR circuit or other comparison unit, 13 is a latch circuit, 14 is a flipflop or other memory unit, and 15 is a logic circuit made with a combination of gate circuits, etc.

A reading timing signal of software (not shown) is applied as a clock signal, clk, to memory units 11, 14, and a reset signal, reset, is applied to latch circuit 13. Detection signal HWt from the fault detection unit is applied to memory unit 11, comparison unit 12, and logic circuit 15. This detection signal HWt is, for example, set to "1" by fault occurrence detection and to "0" by fault release detection, and is stored in memory unit 11 at each reading timing signal. Therefore in comparison unit 12, the detection signal HWt−1 at the previous reading timing and the detection signal HWt at the current time are compared in comparison unit 12, and the comparison result is latched in latch circuit 13 and is held until the next reading timing signal.

If the previous detection signal HWt−1 and the current detection signal HWt are the same, comparison unit 12 produces a comparison agreement "0" or an exclusive OR output "0", and if they are different it produces a comparison agreement "1" or an exclusive OR output "1", it is latched in latch circuit 13, and it is applied to logic circuit 15 as a change detection signal Δ(t,t−1). The logic circuit 15 outputs fault history information SWt based on current detection signal HWt, change detection signal Δ(t,t−1), and previous output signal SWt−1 stored in memory unit 14.

Figure 3:
FIG. 3 is a diagram for explaining the logic of the logic circuit.

FIG. 3 is a diagram for explaining the logic of the logic circuit. What is output is fault history information SWt, which corresponds to previous output information SWt−1 to be input to logic circuit 15 of FIG. 2, change detection signal Δ(t,t−1) latched in latch circuit 13, and current detection signal HWt. That is, the conditions under which fault history information SWt becomes "1" are the case in which, when SWt−1="0", either Δ(t,t−1)="1" or HWt="1" or both, and the case in which, when SWt−1="1", Δ(t,t−1) ="0" and HWt ="1".

Figure 9:
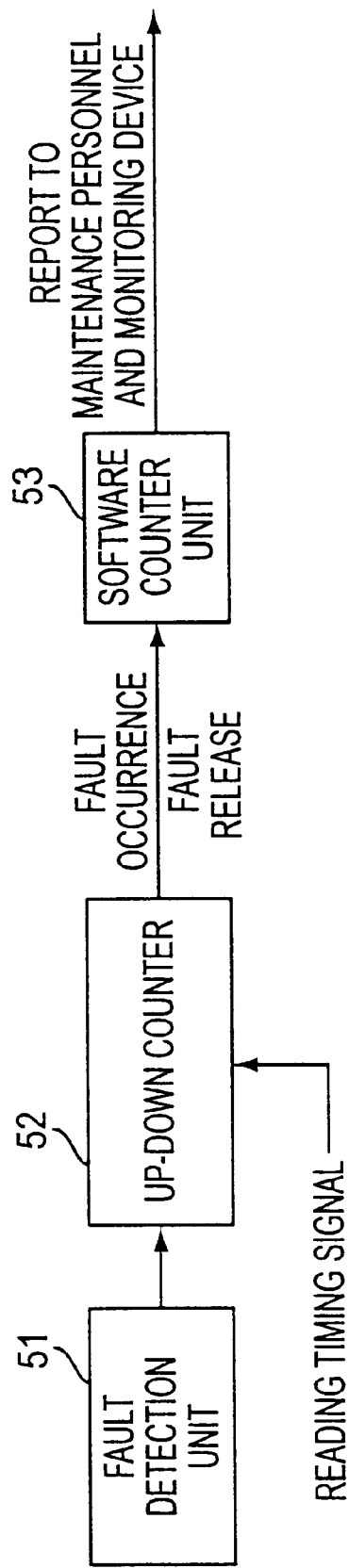
FIG. 9 is an explanatory diagram of a conventional fault monitoring system.

Thus it can be constituted by a simple gate circuit that produces such a logic output or by a memory (ROM) that reads one-bit fault history information SWt by taking as addresses the previous output information SWt−1, the change detection signal Δ(t,t−1) latched of [sic; should be "in"] latch circuit 13, and the current detection signal HWt. Therefore one obtains the advantages that fault history information generation logic unit 2 can be made with a smaller circuit size than the up-down counter, etc. of the previous example shown in FIG. 9, and that one-bit composition suffices for the fault history information, as compared with the information to be reported to the software of the previous example shown in FIG. 10.

Figure 4:
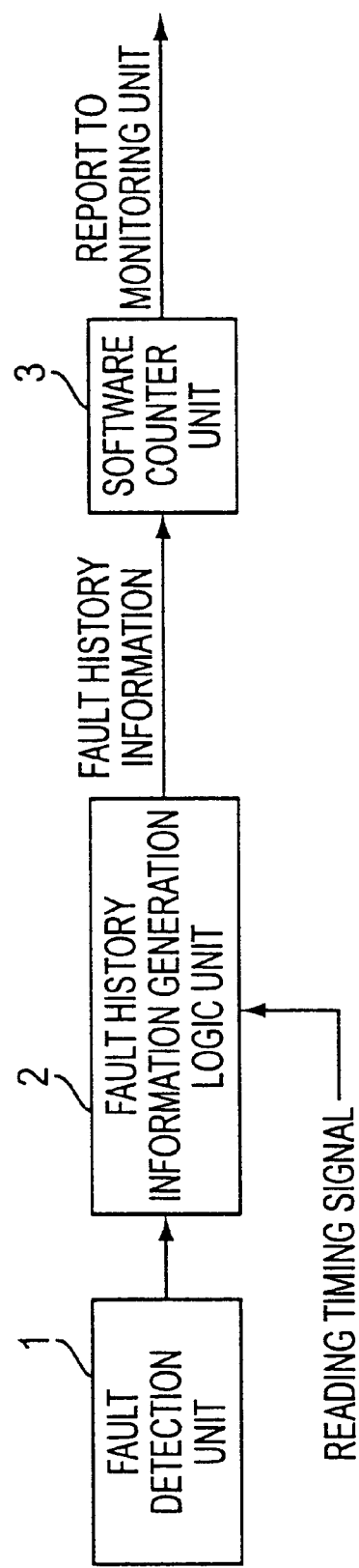
FIG. 4 is block diagram of an embodiment of the fault monitoring system of the present invention.

In FIG. 4, which diagrammatically shows an embodiment of the fault monitoring system of this invention, the same symbols denote the same parts as in FIG. 1, and 3 is a software counter unit. Fault history information generation logic unit 2, which has the composition shown in FIG. 2, inputs to software counter unit 3 one-bit fault history information based on the detection signal from fault detection unit 1.

Figure 5A:
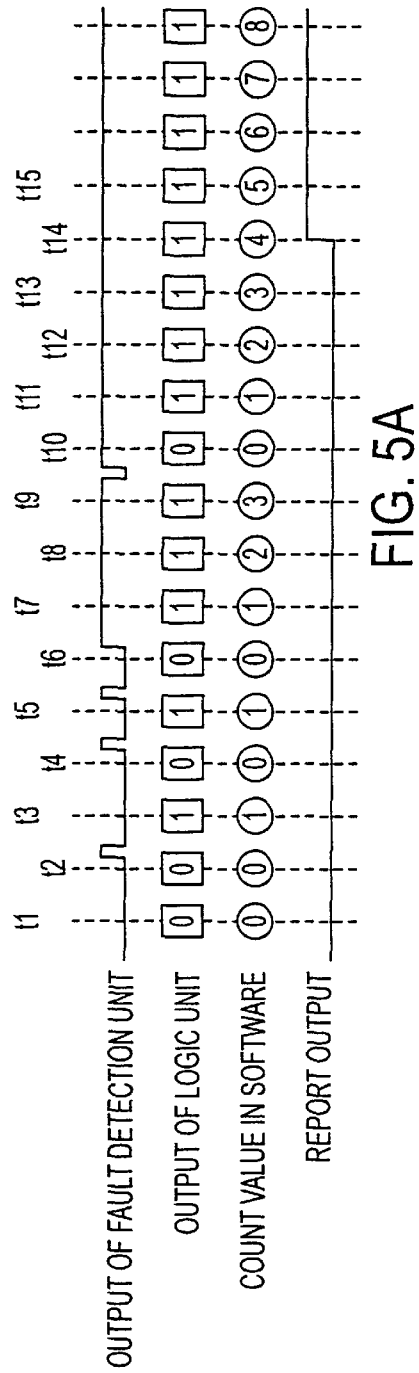
FIGS. 5A–5B are diagrams for explaining the operation of the embodiment of FIG. 4.
Figure 5B:
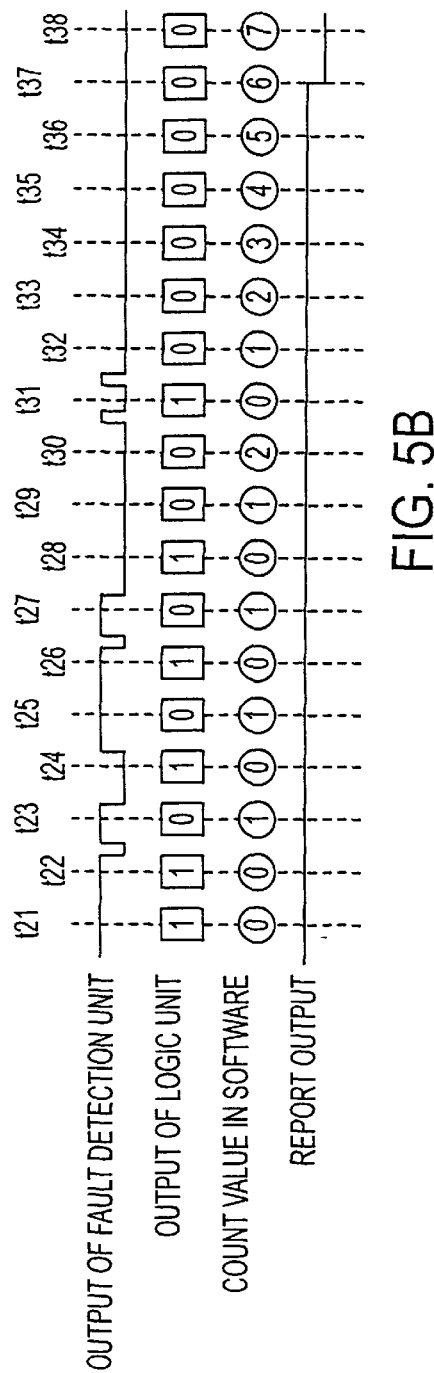

FIGS. 5A–5B explain the operation of an embodiment of this invention. In FIG. 5A, illustrates what happens when a fault occurs, and 5B illustrates what happens when a fault is released; t1, t2, ..., t21, t22, ... denote the software reading timing, and the period can be set to, for example, 500 ms. Also, this period can be set arbitrarily according to the system configuration. In FIGS. 5A–5B, at the software reading timing, the output from fault detection unit 1 (detection signal HWt) is taken into the logic unit (fault history information generation logic unit 2), its output (fault history information SWt) is input into software counter unit 3 and causes count operation, and when the content of the count exceeds a set value, it is reported to a monitoring unit including maintenance personnel and a monitoring device.

For example, by the "1" output of fault detection unit 1 after time t2 in 5A, the output of the logic unit also becomes "1" at time t3, and software counter unit 3 is incremented, but then the output of fault detection unit 1 becomes "0", so at time t4 the output of the logic unit becomes "0", and the count value of software counter unit 3 becomes 0.

Continuously beginning with time t6, the output of fault detection unit 1 is "1", the output of the logic unit is likewise "1", and the count value of software counter unit 3 increments one by one, but when, at time t9, the output of fault detection unit 1 next goes to "0", the output of the logic unit likewise goes to "0", and the count value of software unit 3 becomes 0. Then, beginning with the following time t10, the output of fault detection unit 1 goes to "1", software unit 3 increments at times t11, t12, t13, t14, and when the count value reaches 4, having exceeded the preset value, the notification output "1" indicating fault occurrence is set with respect to the monitoring unit, which includes maintenance personnel and a monitoring device, etc.

Also, in 5B, following output reporting the fault occurrence, at the time of output "0" of fault detection unit 1, that is, when a fault release is detected, software counter unit 3 is incremented, and even though the output of fault detection unit 1 following times t22, t23, t26 goes to "0", after the count value of software unit 3 has gone to 1, it remains 0 until the next timing. And after time t27, the count value of software counter unit 3 reaches 2, but following time t30 it goes to 0.

But after time t32 the output of fault detection unit 1 is continuously "0" and correspondingly the output of the logic unit is continuously "0", so at time t37 the count value of software unit 3 reaches 6, and having exceeded the preset value, a "0" fault release report is made to the monitoring unit, which includes maintenance personnel and a monitoring device.

This case is the case in which the count value for reporting fault occurrences is set to 4 and the count value for reporting fault releases is set to 6, but these set values may be arbitrarily chosen to fit the transmission system.

Figure 6:
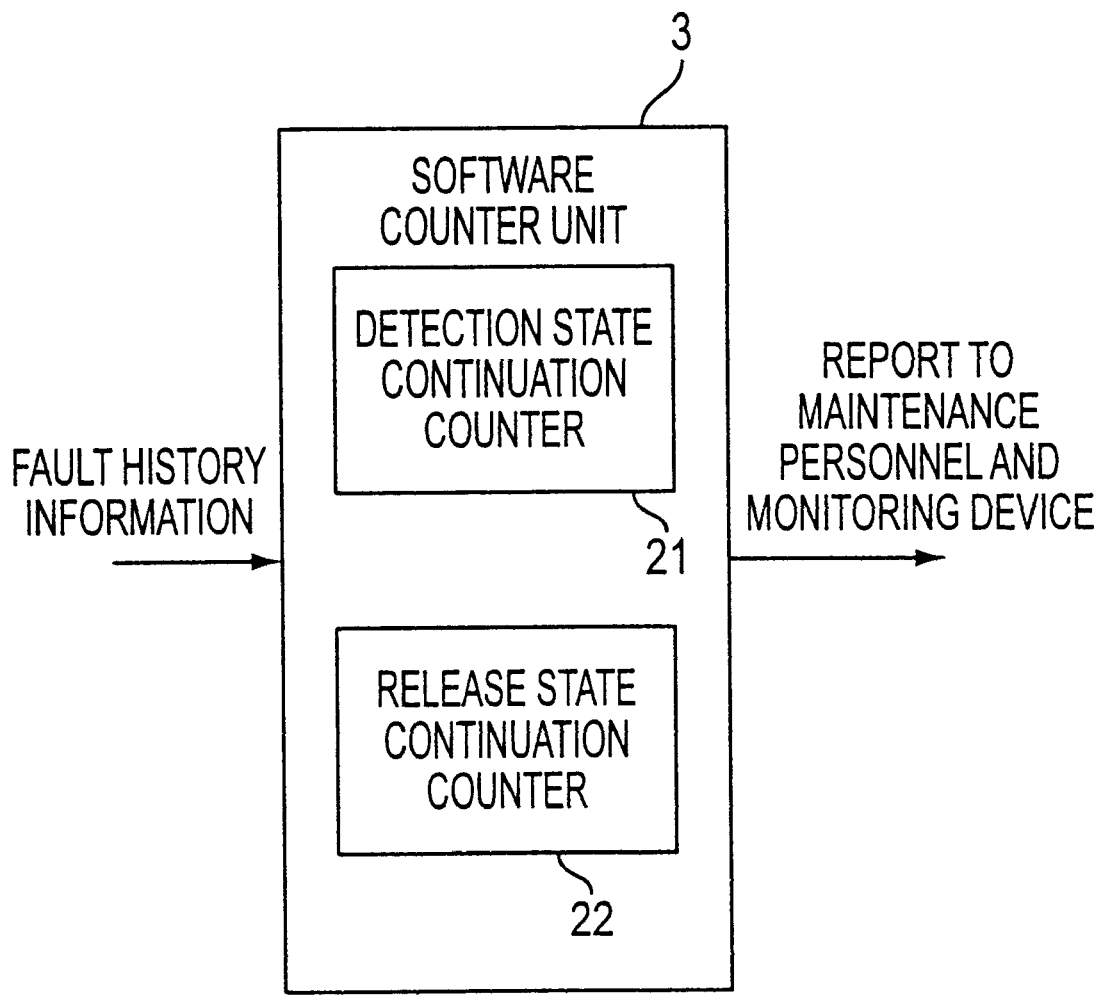
FIG. 6 is a block diagram of the software counter unit of the fault monitoring system of the invention.

FIG. 6, which is a block diagram of the software counter unit, shows the case in which it is constituted so as to include a detection state continuation counter 21 and a release state continuation counter 22; if the one-bit fault history information from fault history information generation logic unit 2 is "1", the count value of the release state continuation counter 22 is set to 0 and the count value of the detection state continuation counter 21 is incremented, and conversely if the fault history information is "0", the count value of the detection state continuation counter 21 is set to 0 and the count value of release state continuation counter 22 is incremented.

These counters 21, 22, which realize their functions by software processing, compare the count value with a preset value; when it is decided that the count value of counter 21 has exceeded the preset value, a fault occurrence is reported to the maintenance personnel and monitoring device, and when it is decided that the count value of counter 22 has exceeded the preset value, a fault release is reported to the maintenance personnel and monitoring device. That is, the set value for fault occurrence reporting and the set value for fault release reporting can be set independently.

Figure 7:
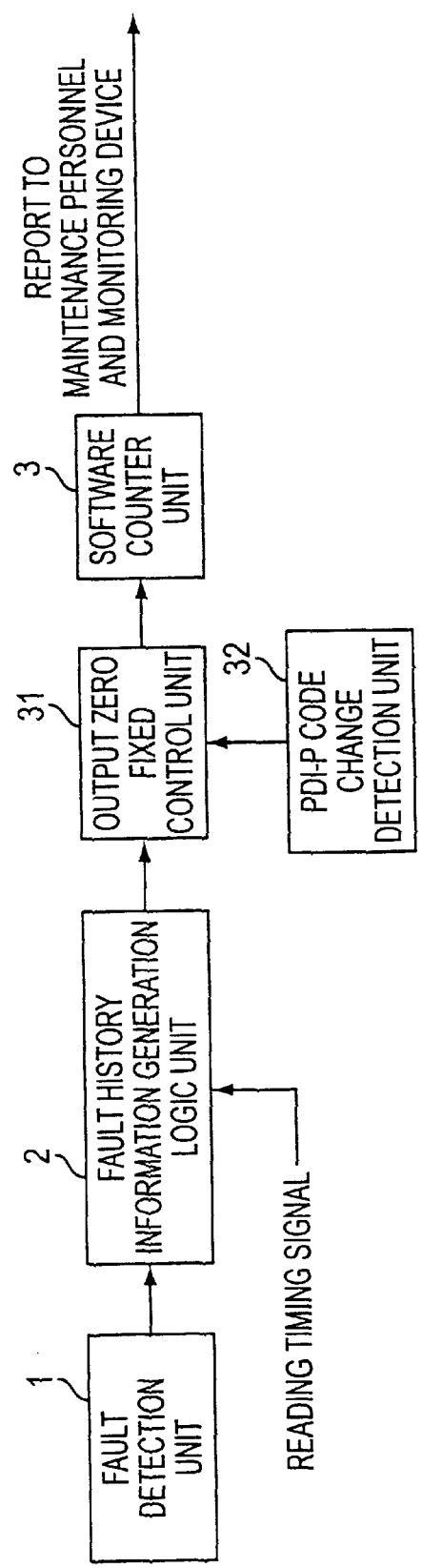
FIG. 7 is a block diagram of another embodiment of the fault monitoring system of the present invention.

FIG. 7 diagrammatically shows another embodiment of the fault monitoring system of this invention. In FIG. 7, 1 is a fault detection unit, 2 is a fault history information generation logic unit, 3 is a software counter unit, 31 is an output zero fixed control unit, and 32 is a PDI-P code change detection unit. According to this embodiment, in a transmission system employing optical transmission paths, etc., the number of faulty circuits, etc. among multiplexed circuits is reported by PDI-P code; for example, there are C2 bytes in the path overhead of a multiplex transmission frame in SONET (synchronous optical network) or SDH (synchronous digital hierarchy), and the number of faulty circuits can be transmitted by PDI-P (payload detect indication -P) code using these C2 bytes.

There are cases including fault occurrence circuits due to the fault, etc. of the transmission and reception units in multiplexed circuits even if the transmission path connected to the transmission device is not cut off. Thus it is possible, based on the PDI-P code received via the transmission path between the work side and the production side in a transmission system of redundant configuration, to improve the transmission quality by selecting the transmission path having fewer faulty circuits. This PDI-P code also can be changed to correspond to an increase or decrease in the number of faulty circuits.

Thus in the configuration shown in FIG. 7, one has an output zero fixed control unit 31 and a PDI-P code change detection unit 32 and controls them so that if a PDI-P code change is detected by PDI-P code change detection unit 32, the count value of software counter unit 3 is forcibly reset to 0 by output zero fixed control unit 31. Thereafter, the counter operation of software counter unit 3 is carried out according to the fault history information from fault history information generation logic unit 2, and when the preset value is exceeded, it is reported to a monitoring unit, such as maintenance personnel and a monitoring device. In this way, along with notification of fault occurrence and fault release, the fact that there has been a change in the PDI-P code is also reported to the monitoring unit, which includes maintenance personnel, a monitoring unit, etc.

Figure 8:
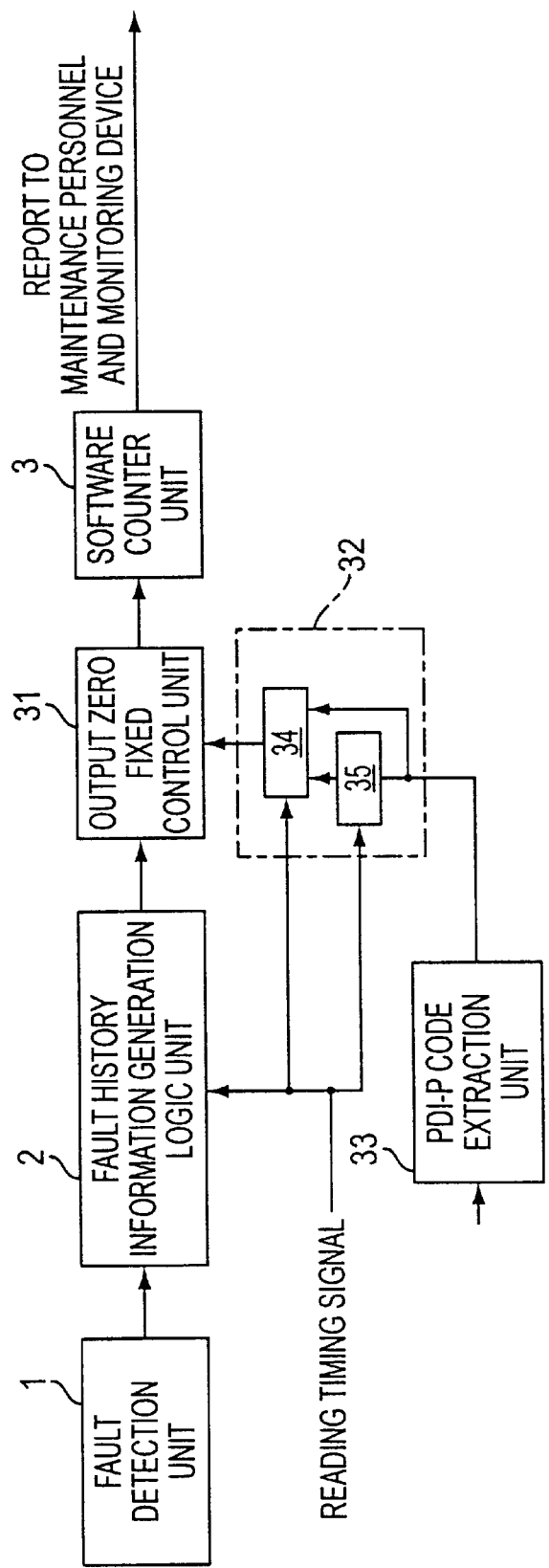
FIG. 8 is a detailed diagram of another embodiment of the fault monitoring system of the invention.

In FIG. 8, which is a detailed block diagram of another embodiment of the fault monitoring system of this invention, the same parts are labeled with the same symbols as in FIG. 7. Further, 33 is a PDI-P code extraction unit, 34 is a comparison unit, and 35 is a memory unit. The PDI-P code extraction unit 33 extracts the PDI-P code by the C2 bytes of path overhead in the multiplex transmission frame in a SONET, SDH, or other transmission system and inputs it to PDI-P code change detection unit 32. Known configurations can be applied to such a path overhead byte extraction means.

Control is executed so that extracted PDI-P code is stored in memory unit 35 according to a reading timing signal, the previous PDI-P code and the current PDI-P code are compared in comparison means 34, and if they do not agree, that is, if the number of faulty circuits has changed, the count value of software counter unit 3 is forcibly set to 0 by output zero fixed control unit 31. For example, if the fault history information from fault history information generation logic unit 2 temporarily is set to "1" during a succession of "0"s, the release state continuation counter and the detection state continuation counter can be reset, and if the fault history information is in the midst of a succession of "1"s, it can temporarily be set to "0", and the detection state continuation counter and release state continuation counter can be reset.

After the software counter unit 3 has been reset, the counter operation is carried out in correspondence with the fault history information from fault history information generation logic unit 2, and when the count value exceeds the preset value, it is reported to the monitoring unit of maintenance personnel, maintenance device, etc., and by confirmation, etc. of the content of the report, one can confirm the existence of a change in the PDI-P code; for example, upon demand of maintenance personnel, one can read the content of the PDI-P code extracted by PDI-P code extraction unit 33 and the control path, which is not pictured. And if the number of faulty circuits in the work-side transmission path is greater than the number of faulty circuits in the production-side transmission path, one can carry out control whereby one switches over from the work-side transmission path to the production-side transmission path. In this way, one can suppress degradation of the quality of the transmission system and improve its reliability.

The above-discussed FIGS. 7 and 8 show the case in which the PDI-P code that indicates the number of faulty circuits is used as system state information, but it is also possible to use other state information transmitted using specified bytes of the overhead as with the PDI-P code, and to notify the monitoring unit by detecting any changes in it. In that case, PDI-P code change detection unit 32 serves as a state information change detection unit, and by detecting changes in the state information, output zero fixed control unit 31 is notified, software counter unit 3 is forcibly reset, and after the count value is set to 0, the fault history information from fault history information generation logic unit 2 is counted by software counter unit 3, and when its count value exceeds the preset value, the monitoring unit is notified, and the monitoring unit can recognize changes in the state information and confirm the content of the extracted state information as in the case of the PDI-P code.

Effects of the Invention

Figure 10:
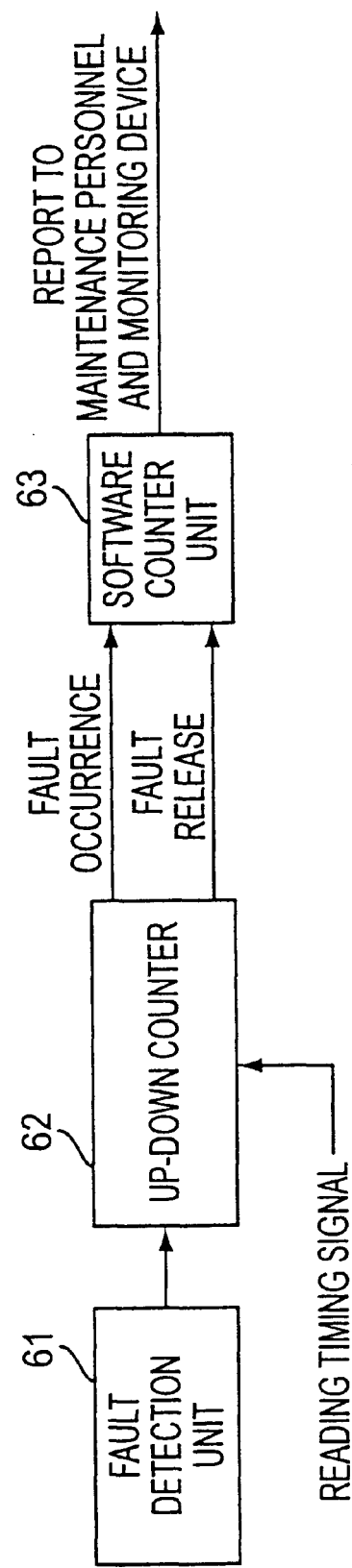
FIG. 10 is an explanatory diagram of another conventional fault monitoring system.

As described above, in the present invention, fault occurrence information or fault release information detected by fault detection unit 1 is input by fault history information generation logic unit 2 into software counter unit 3 as one-bit fault history information based on the presence of any change in each reading timing of the software, and it is decided according to the count value whether the fault occurrence has continued for the prescribed time or the fault release has continued for the prescribed time, and because it suffices to convey one-bit fault history information from the hardware side to the software side, if for example the number of bits to be conveyed is 16 bits, with this invention, because the information can be conveyed in one bit, 16 types of information can be conveyed, unlike the previous example shown in FIG. 10, in which information on [only] eight types of faults can be conveyed because the information is conveyed in two bits each. And because fault history information generation logic unit 2 has a simpler composition than the hardware counter shown in FIG. 9, there is the advantage that the circuit size can be reduced.

With the output zero fixed control unit 31 provided between fault history information generation logic unit 2 and software counter unit 3, there is the advantage of being able to detect any change in the state information, such as the PDI-P code, in a multiplex transmission system, reset software counter unit 3, and report any change in state information to the monitoring unit, which includes maintenance personnel and a monitoring unit, when the count value produced by resumed count operation reaches a set value. In this way it is possible to recognize any changes in the state information, such as any change in the number of faulty circuits, and for example select the transmission path having fewer faulty circuits, thereby improving the reliability of a multiplex transmission system.

What is claimed is:

1. A fault monitoring system that monitors faults of units in a transmission system and reports the monitored faults to a monitoring unit, comprising:

a fault detection unit that detects occurrence of faults and release of faults;

a software counter unit; and a fault history information generation logic unit that reports to said software counter unit, as fault history information of one-bit composition, the presence of any change based on a fault occurrence information or a fault release information from said fault detection unit, the presence of any change for each reading timing, and a previous-time output information.

2. The fault monitoring system as described in claim 1, wherein said software counter unit counts a consecutive number of times of the same fault history information from said fault history information generation logic unit and reports fault occurrences or fault releases to said monitoring unit upon reaching a set count value.

3. The fault monitoring system as described in claim 2, and further comprising a change detection unit that detects changes in a fault occurrence circuit number or other state information; and an output zero fixed control unit that forcibly resets a count value of said software counter unit that inputs the fault history information from said fault history information generation logic unit when a change in said state information is detected by said change detection unit.

4. A fault reporting method for reporting faults of units in a transmission system, comprising the steps of:

providing a fault monitoring system having a fault detection unit, a software counter unit, and a fault history information generation unit;

deciding whether there is any change for each reading timing of fault occurrence information or fault release information from the fault detection unit, fault history information of one-bit composition is formed and the consecutive number of times the same content of said history information occurs is counted by the software counter unit; and when a count exceeds a set value, the fault occurrence or fault release is reported to a monitoring unit of the transmission system.

5. The fault reporting method as described in claim 4, wherein state information including a number of circuits on which faults occur is extracted, and when there is a change in said state information, the count value of said software counter unit is forcibly reset, then a count operation is performed in accordance with the fault history information from said fault history information generation logic unit.

* * * * *